(12) United States Patent
Pertot et al.

(10) Patent No.: US 12,124,158 B2
(45) Date of Patent: Oct. 22, 2024

(54) PROJECTION DEVICE AND METHOD FOR DIRECTING A LIGHT BEAM TO A TARGET

(71) Applicant: QUBIG GMBH, Munich (DE)

(72) Inventors: Daniel Pertot, Munich (DE); Enrico Vogt, Munich (DE)

(73) Assignee: QUBIG GMBH, Munich (DE)

( * ) Notice: Subject to any disclaimer, the term of this patent is extended or adjusted under 35 U.S.C. 154(b) by 457 days.

(21) Appl. No.: 17/596,323

(22) PCT Filed: Jun. 17, 2020

(86) PCT No.: PCT/EP2020/066825
§ 371 (c)(1),
(2) Date: Dec. 7, 2021

(87) PCT Pub. No.: WO2020/254444
PCT Pub. Date: Dec. 24, 2020

(65) Prior Publication Data
US 2022/0252966 A1 Aug. 11, 2022

(30) Foreign Application Priority Data
Jun. 21, 2019 (EP) ..................... 19181739

(51) Int. Cl.
*G03B 21/14* (2006.01)
*G03B 21/20* (2006.01)
(52) U.S. Cl.
CPC ....... *G03B 21/142* (2013.01); *G03B 21/2033* (2013.01)
(58) Field of Classification Search
CPC .......................... G03B 21/142; G03B 21/2033

USPC .......................................................... 353/101
See application file for complete search history.

(56) References Cited

U.S. PATENT DOCUMENTS

| 2004/0218155 A1 | 11/2004 | Schenk et al. |
| 2009/0016061 A1 | 1/2009 | Chen et al. |
| 2009/0171329 A1 | 7/2009 | Raksi et al. |

FOREIGN PATENT DOCUMENTS

| CN | 108398779 A | * | 8/2018 | ......... G02B 26/0833 |
| DE | 20 2010 004 547 U1 | | 11/2011 | |
| EP | 1 419 411 B1 | | 5/2004 | |
| EP | 2 146 243 A1 | | 1/2010 | |
| GB | 1224331 A | * | 4/1968 | ............... G02F 1/29 |

(Continued)

OTHER PUBLICATIONS

Translation of 1083398779 (Year: 2024).*

(Continued)

*Primary Examiner* — Jerry L Brooks
(74) *Attorney, Agent, or Firm* — Lewis Roca Rothgerber Christie LLP

(57) ABSTRACT

A control unit (130) is provided for controlling a projection device (100) for directing a light beam (101) to a target (140). The projection device (100) comprises a light beam deflection unit (120) for two-dimensionally deflecting a light beam (101) in a first direction (x) with a first deflection frequency and in a second direction (y) with a second deflection frequency substantially equal to the first deflection frequency. The control unit (130) is configured to control the deflection unit (120) in such a way that a light spot (141) generated by the light beam (101) on the target (140) moves along a nearly circular path (144) changing its radius (R) over time.

15 Claims, 7 Drawing Sheets

(56) References Cited

FOREIGN PATENT DOCUMENTS

GB        1 224 331      3/1971
TW     200903138 A   1/2009

OTHER PUBLICATIONS

International Search Report of PCT/EP2020/066825, Oct. 14, 2020, 3 pages.
Fukuda et al. "Simulation of spiral beam scanning for uniform irradiation on a large target", Nuclear Instruments and Methods in Physics Research. Section A, Elsevier BV * North-Holland, NL, vol. 396, No. 1-2, Sep. 1, 1997, pp. 45-49.
Oehler et al. "New random trigger-feature for ultrashort-pulsed laser increases throughput, accuracy and quality in micromachining applications", SPIE LASE proceedings 10091, Laser Applications in Microelectronic and Optoelectronic Manufacturing XXII, 2017.

\* cited by examiner

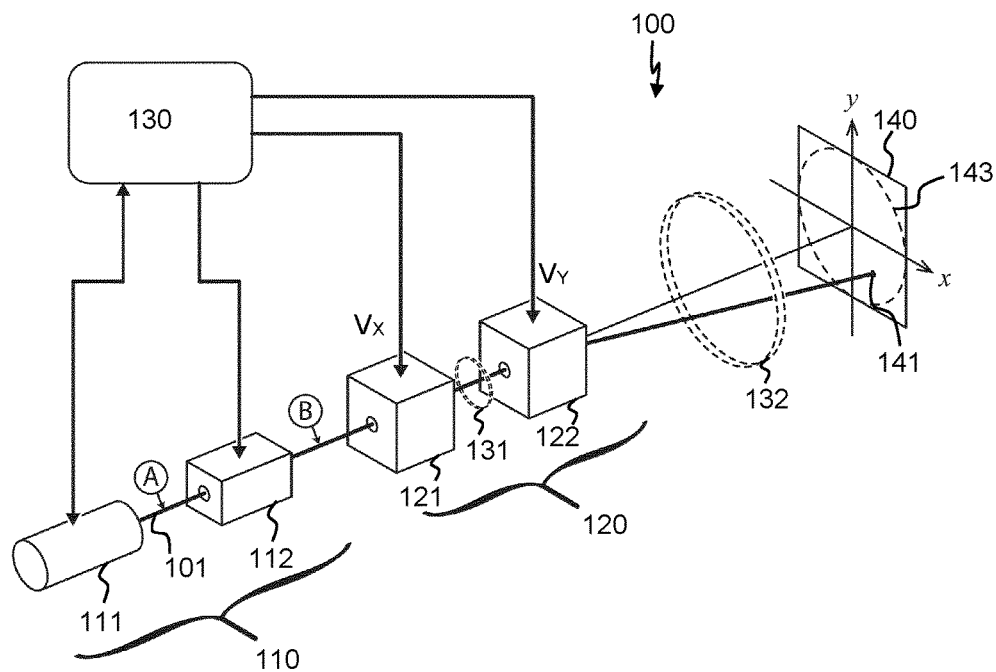
Fig. 1
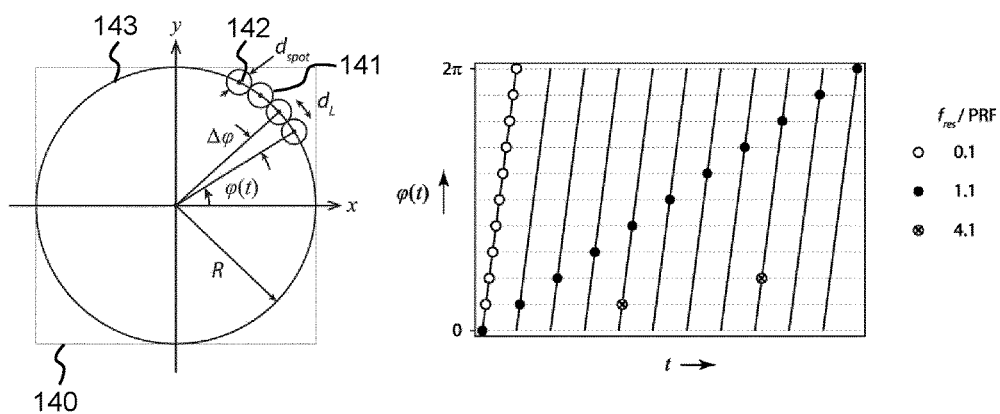
Fig. 2
Fig. 3

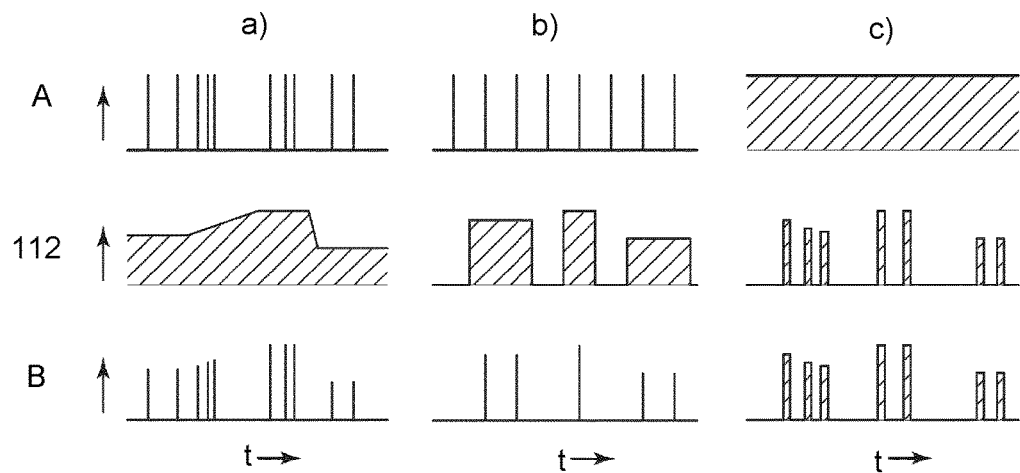
Fig. 13
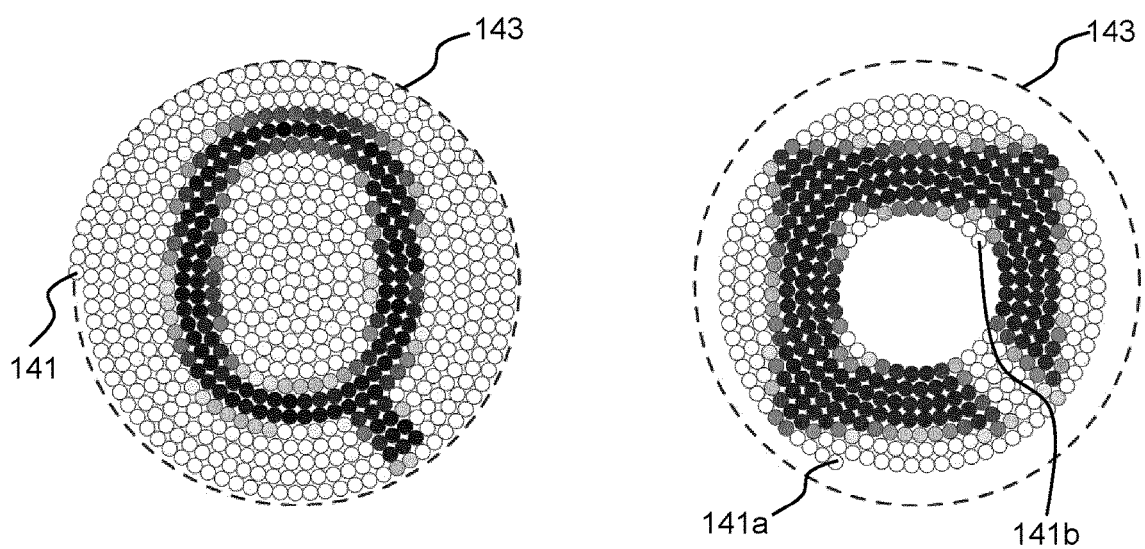
Fig. 14a
Fig. 14b

PROJECTION DEVICE AND METHOD FOR DIRECTING A LIGHT BEAM TO A TARGET

CROSS-REFERENCE TO RELATED APPLICATION(S)

This application is a U.S. National Phase Patent Application of International Application Number PCT/EP2020/066825, filed on Jun. 17, 2020, which claims priority to European Patent Application Number 19181739.4, filed Jun. 21, 2019. The entire content of each of which is incorporated herein by reference.

The present invention relates to a projection device and method for directing a light beam to a target, and especially to a projection device and method for directing a light beam to a target using a resonantly enhanced two-dimensional beam deflecting device, i.e. a deflecting device operated by an electrical signal having a small bandwidth.

Conventional beam deflecting devices comprise movable mechanical elements such as galvanometer mirrors which are controlled by an electrical signal and change their position depending on the electrical signal. When two deflecting devices are combined in such a way that their deflection directions are perpendicular to each other, a two-dimensional deflecting device is generated. By selecting the voltages applied to each of the two electro-optic deflectors in a suitable way, any two-dimensional deflection direction may be achieved. A light beam thus can be directed to any point of a screen or of any object (designated in the following by the term "target") arranged in the optical path downstream of the deflecting device. Due to the fact that macro-mechanical parts have to be moved, conventional beam deflecting devices have a high mechanical inertia and therefore can only slowly react to changes of the applied voltages.

As inertia-free beam deflecting devices, electro-optic deflectors are known in the art. Electro-optic deflectors use crystals made of a material exhibiting an electro-optic effect. When a voltage gradient is applied to the crystal, a light beam propagating through the crystal is deflected. The deflection is proportional to a voltage gradient applied to the electro-optic crystal. However, since the electro-optic effect is very small, high voltages have to be applied to achieve a desired deflection. Typically, an operating voltage for common electro-optic deflectors available on the market lies in the range of some hundred volts to some kilovolts.

In order to achieve higher voltages from an input signal, resonant circuits have been proposed to increase the voltage applied to the electro-optic crystal. Such resonantly enhanced electro-optic modulators may be operated with smaller external voltages because the high voltages required for the operation are internally generated. On the other hand, such resonant circuits only allow an operation within a small frequency range around the resonance frequency. Based on the approximately sinusoidal waveform of the voltage applied to the electro-optic crystal, the scanning speed of an impact point of the light beam on the target varies. This may lead to problems such as the following:

In material processing such as laser cutting, for example, a pulsed laser beam is directed to the target to be cut. Due to the different scanning speed, the impact points of the laser beam on the target are closer to each other at the end of a line scanned by the laser beam than in the center of the line. This leads to a higher temperature and stronger melting of the material at the end of the line which may result in irregular edges of the cut material.

Andreas Oehler et al. "New random trigger-feature for ultrashort-pulsed laser increases throughput, accuracy and quality in micromachining applications", SPIE LASE proceedings 10091, Laser Applications in Microelectronic and Optoelectronic Manufacturing (LAMOM) XXII, 2017 describe a method by which a laser may randomly be triggered in order to compensate that effect. Thereby, evenly spaced impact points of the laser beam on the material to be machined can be achieved even if the scanning speed is not constant.

In DE 20 2010 004 547 U1 the change of the deflection angle over time is linearized by providing multiple resonant circuits for the deflector, thus generating linearized waveforms by superimposing signals having multiple frequencies with suitable amplitudes and phases.

Conventionally, a method for projecting an image, for example on TV or on a computer monitor, divides an image frame into individual rows which are individually scanned one after the other until the frame is finished. The row frequency (for example in a horizontal direction) is the reciprocal value of the time required for scanning a row, whereas the frame frequency (for example in the vertical direction) is the reciprocal value of the time required for scanning the entire frame. The row frequency is by the number of rows higher than the frame frequency.

If two deflectors operating in the resonant mode are combined to form a two-dimensional deflecting device, resonant frequencies with such a high difference are difficult to realize, especially if in other aspects, the two deflectors shall have the same characteristics.

EP 1 419 411 B1 attempts to solve the problem of the large frequency difference in the resonant mode by selecting resonant frequencies which are close to each other and have a frequency ratio between each other defined by a quotient or fraction of two different integers. Thereby, the light beam describes a Lissajous figure on a target. The intersection points of the grid formed by the Lissajous figure may be used as picture elements (pixels). However, the intersection points are closer to each other at the border of the frame, resulting in a nonlinear distribution of the pixels. Therefore, only about 60% of the lateral dimensions, i.e. only about 36% of the area that might be reached by the deflection device can be used without resorting to complicated pulse timing methods or position feed-back mechanisms.

It is therefore an object of the present invention to provide an improved projection device and method for directing a light beam to a target in which at least some of the problems occurring in the prior art indicated above are overcome.

The foregoing and other objects are achieved by the features of the independent claims. Further implementation forms are apparent from the dependent claims, the description and the figures. Therein, the method claims may also be further restricted by the features of the dependent product claims and vice versa.

A control unit according to the present invention serves for controlling a projection device for directing a light beam to a target. The projection device comprises a (first) light beam deflection unit for two-dimensionally deflecting a light beam in a first direction with a first deflection frequency and in a second direction with a second deflection frequency. The control unit is configured to control the deflection unit in such a way that a light spot generated by the light beam on the target moves along a nearly circular path changing its radius over time.

With such a control unit, it is for example possible to combine the advantage of a resonantly enhanced deflection system, that means that a ratio between a deflection achieved and a voltage externally supplied is increased, with the advantage of a deflection system which is not resonantly enhanced, i.e. that each point of an imaging area can be scanned by the light beam in an easily addressable way, that means that a simple time-to-space mapping exists.

Nearly circular in that context means that a the light spot moves on the target (which may for example be a plane) along a curve in which, described in polar coordinates, a phase angle continuously increases and a radius only slowly increases or decreases so that after a phase change of $2\pi$, the end point is near the start point or, in other words, multiple phase changes of $2\pi$ are required for changing the radius from zero to its maximum value. Such a nearly circular curve may for example be a winding of a spiral.

In order to be able to generate a nearly circular path, the two deflection frequencies have to be essentially the same. A small difference may be tolerable and still leads to a nearly circular path changing its radius over a period of time in which the entire imaging area or frame is scanned once. That means that there may be a frequency difference which is significantly less than a frame repetition frequency. The best result, however, is achieved if the two deflection frequencies are equal because the path on the target then can be made reproducible each time the imaging area is scanned.

The first light beam deflection element may be controlled by a first alternating current voltage to deflect the light beam in the first direction, and the second light beam deflection element may be controlled by a second alternating current voltage to deflect the light beam in the second direction. An amplitude of the alternating current voltages may synchronously be increased or decreased so that a light spot generated by the light beam on the target moves along a spiral.

Thereby, it is for example possible to completely scan an imaging area within one frame period during which a radius of the spiral increases from zero to its maximum value or vice versa.

Synchronously in this context means that the amplitude of the alternating current voltages are increased or decreased with the same timing, for example using the same set signal.

The control unit may be configured to control the deflection unit in such a way that an amplitude of the alternating current voltages is repeatedly increased from zero to a maximum amplitude within a first time span and thereafter decreased again to zero within a second time span shorter than the first time span, or reverse. The control unit may be configured to control the deflection unit in such a way that an amplitude of the alternating current voltages is repeatedly increased from zero to a maximum amplitude within a first time span and thereafter decreased again to zero within a second time span equal to the first time span. The control unit may be configured to maintain the amplitude of the alternating current voltages at the maximum amplitude for a third time span shorter than the first and second time spans. The control unit may be configured to achieve a phase jump of 180° in a waveform of the alternating current voltages at the time the amplitude reaches the value of zero.

Thereby, it is for example possible to provide different ways of generating a spiral as a trajectory of the light spot on the target.

The control unit may be configured to control the deflection unit in such a way that a radial distance between subsequent windings of the path is constant, for example equal to a spot diameter of a light spot generated by the two-dimensionally deflected light beam on the target.

Thereby, it is for example possible to generate a trajectory in which the light spots formed in subsequent windings on the target are adjacent to each other.

The control unit may be configured to control a light beam generation unit to generate the incoming light beam as a sequence of light pulses. A pulse repetition frequency of the incoming light beam may be modified depending on an instantaneous radius of the path, it may for example be made proportional to the instantaneous radius. The control unit may be configured to control the light beam generation unit so that the pulse repetition frequency of the incoming light beam is set or varied in such a way that a distance between the center points of adjacent light spots is equal to the spot diameter.

Thereby, it is for example possible to generate a trajectory in which subsequent light spots formed on the target are adjacent to each other.

The control unit may be configured to control the light beam generation unit in such a way that an intensity of the incoming light beam is set or varied depending on the instantaneous phases and amplitudes of the alternating current voltages.

Thereby, it is for example possible to project a desired image pattern to the target.

A projection device according to the present invention serves for directing a light beam to a target. The projection device comprises a first light beam deflection unit for two-dimensionally deflecting a light beam in a first direction with a first deflection frequency and in a second direction with a second deflection frequency substantially equal to the first deflection frequency. The projection device further comprises a control unit according to the present invention for controlling the first light beam deflection unit.

With such a projection device, it is for example possible to combine the advantage of a resonantly enhanced deflection system, that means that a ratio between a deflection achieved and a voltage externally supplied is increased, with the advantage of a deflection system which is not resonantly enhanced, i.e. that each point of an imaging area can be scanned by the light beam.

The first light beam deflection unit may comprise a first deflection element, preferably an electro-optic deflector or a micro-opto-electromechanical mirror, for deflecting the incoming light beam in the first direction and generating a one-dimensionally deflected light beam, and a second deflection element, preferably an electro-optic deflector or a micro-opto-electromechanical mirror, for deflecting the one-dimensionally deflected light beam in the second direction and generating the two-dimensionally deflected light beam. The first and/or second deflection element may be resonantly enhanced for internally generating a signal having an amplitude increased over the amplitude of the alternating current voltages.

Thereby, it is for example possible to obtain a specific way for achieving the two-dimensional deflection.

The projection device may further comprise a light beam generation unit for generating the incoming light beam. The light beam generation unit may comprise a light source for generating an unmodulated light beam, and an intensity modulation element for modulating an intensity of the unmodulated light beam.

Thereby, it is for example possible to generate a light beam which, together with the specific time control of the deflection, is able, for example, to generate an image to be projected on the target or a light pattern for machining the target.

The light source may be configured to emit a light beam comprising light pulses having a constant amplitude and variable time distance and the intensity modulation element is configured to selectively modify an amplitude of each of the light pulses. The light source may be configured to emit a light beam comprising light pulses having a constant amplitude and constant pulse repetition frequency and the intensity modulation element is configured to blank out individual light pulses and to selectively modify an amplitude of each of the remaining light pulses. The light source may be configured to emit a continuous wave light beam having a constant amplitude and the intensity modulation element is configured to form individual light pulses from the continuous wave light beam and to selectively modify an amplitude of each of the formed light pulses.

Thereby, it is for example possible to provide different ways for achieving a waveform of the light beam suitable for the respective application.

The projection device may further comprise a second light beam deflection unit for two-dimensionally deflecting the deflected beam emitted by the first light beam deflection unit and directing the twice two-dimensionally deflected light beam to the target. The first light beam deflection unit may be a resonantly enhanced deflection unit exhibiting a small maximum deflection. The second light beam deflection unit may be a not resonantly enhanced deflection unit comprising movable parts and exhibiting a large maximum deflection. The control unit may be configured to control the second light beam deflection unit in such a way that a center of the spiral generated by the first light beam deflection unit is slowly or stepwise moved along a path on the target.

Thereby, it is for example possible to significantly increase an area that can be reached by the light beam, while the precision and speed of the resonantly enhanced deflection unit is maintained.

A method according to the invention serves for controlling a projection device for directing a light beam to a target. The projection device comprises a light beam deflection unit for two-dimensionally deflecting a light beam in a first direction with a first deflection frequency and in a second direction with a second deflection frequency substantially equal to the first deflection frequency. The method comprises controlling the deflection unit in such a way that a light spot generated by the light beam on the target moves along a nearly circular path changing its radius over time. With such a method, it is for example possible to combine the advantage of a resonantly enhanced deflection system, that means that a ratio between a deflection achieved and a voltage externally supplied is increased, with the advantage of a deflection system which is not resonantly enhanced, i.e. that each point of an imaging area can be scanned by the light beam.

Another method according to the invention serves for directing a light beam to a target. The method comprises two-dimensionally deflecting an incoming light beam in a first direction with a first deflection frequency and in a second direction with a second deflection frequency substantially equal to the first deflection frequency. The method further comprises controlling the deflection in such a way that a light spot generated by the light beam on the target moves along a nearly circular path changing its radius over time. With such a method, it is for example possible to combine the advantage of a resonantly enhanced deflection system, that means that a ratio between a deflection achieved and a voltage externally supplied is increased, with the advantage of a deflection system which is not resonantly enhanced, i.e. that each point of an imaging area can be scanned by the light beam.

Further features and useful aspects of the invention can be found in the description of exemplary embodiments with reference to the attached drawings.

FIG. 1 shows a schematic perspective view of a two-dimensional projection device according to a first embodiment of the present invention.

FIG. 2 shows positions of light spots of a deflected light beam on a target.

FIG. 3 shows a time diagram illustrating examples for a relation between pulse repetition frequencies and resonant frequencies in order to obtain a specific pattern of light spots.

FIGS. 13a to 13c show schematic time diagrams illustrating the generation of light pulses.

FIGS. 14a and 14b show examples for patterns generated by the projection device.

Figure 4:
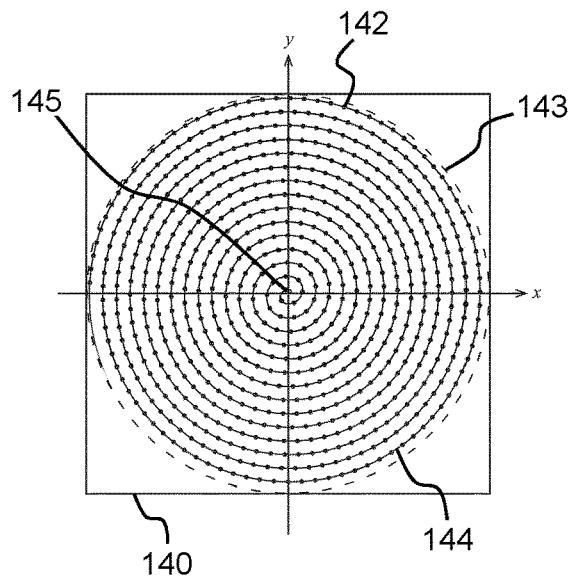
FIG. 4 shows a trajectory followed by the deflected light beam on the target.

In the following, embodiments of the invention are described with reference to the enclosed drawings.

FIG. 1 shows a schematic perspective view of a two-dimensional projection device according to a first embodiment of the present invention.

The projection device 100 comprises a light beam generation unit 110, a light beam deflection unit 120, and a control unit 130 for controlling and driving the light beam generation unit 110 and the light beam deflection unit 120.

The light beam generation unit 110 comprises a light source 111, for example a laser, emitting a light beam 101. The light source might also be an end of an optical fiber from which the light beam 101 is coupled out. Within the projection device, the light beam is modified with regard to its amplitude and direction, but it always stays the same light beam and therefore is indicated in all the figures by the reference sign 101. The light beam generation unit 110 optionally may further comprise an intensity modulation element 112 for modulating an intensity of the light beam 101 emitted by the light source 111. The intensity modulation element 112 may for example comprise an electro-optic modulator or an acousto-optic modulator. The intensity modulation element 112 emits a light beam 101 which may be modulated in its intensity.

The light beam deflection unit 120 serves for deflecting the light beam 101. In order to achieve a two-dimensional deflection, the light beam deflection unit 120 comprises two one-dimensional deflection elements 121, 122. The deflection elements 121, 122 may for example be resonantly-enhanced deflection elements such as electro-optic deflectors which are controlled by alternating current voltages. The first deflection element 121 deflects the light beam 101 in a first direction, for example a horizontal direction or x-direction, based on a first alternating current voltage $V_x$ received from the control unit 130, and emits a one-dimensionally deflected light beam 101. The second deflection element 122 deflects the light beam 101 in a second direction, for example a vertical direction or y-direction, based on a second alternating current voltage $V_y$ received from the control unit 130, and emits a two-dimensionally deflected light beam 101. The two deflection elements 121, 122 are arranged in such a way that their respective deflection directions are oblique to each other, preferably perpendicular to each other. Instead of the transmitting deflection elements shown in the figure, reflecting deflection elements, for example resonantly enhanced micro-opto-electromechanical mirrors, may also be used.

Further optical elements such as mirrors or lenses may optionally be arranged in the optical path for further forming, focusing or deflecting the light beam. As (non-limiting) examples, the figure shows in dashed lines relay optics 131 between the two deflection elements 121, 122, for example a lens system for imaging the x and y deflection planes into each other, and focusing optics 132 downstream of the second deflection element 122, for example planar field optics, f-theta lenses and so on, depending on the application.

In operation, a light beam 101 having a desired waveform (intensity over time) is generated by the light beam generation unit 110 and two-dimensionally deflected by the light beam deflection unit 120 according to control signals $V_x$, $V_y$ applied to the first and second deflection elements 121, 122. The two-dimensionally deflected light beam 101 finally hits a target 140, for example a screen onto which an image is to be projected or a piece of a material that is to be treated by the beam.

The operation is controlled by the control unit which calculates the timing required, sends and/or receives control signals to/from the light source 111, controls and drives the intensity modulation element 112 and controls and drives the first and second deflection elements 121, 122.

The maximum image area that may be irradiated by the light beam 101 is a rectangle, or, if the maximum deflection by the two deflection elements 121, 122 is the same, a square which is indicated in the figure by a solid line.

In the present embodiment, the two deflection elements 121, 122 are resonantly enhanced. Resonantly enhanced means that they comprise resonant elements for internally generating a signal having an amplitude increased over the amplitude of the alternating current voltages ($V_x$, $V_y$) supplied from the outside. Due to the resonance characteristics, the deflection elements 121, 122 are operated with an approximately sinusoidal signal. If the two alternating current voltages ($V_x$, $V_y$) are controlled to have a phase difference of 90°, the maximum image area that may be irradiated by the light beam with the maximum available amplitude is a circle 143 which is indicated in the figure by a dashed line on the target 140.

FIG. 2 shows a case in which the two resonantly enhanced deflection elements 121, 122 are operated with control signals at the resonance frequency f res having the same amplitude and a phase difference of 90°. Further, it is assumed that the two deflection elements 121, 122 have the same deflecting characteristics and that their deflecting directions are perpendicular to each other. That means that a maximum deflection amplitude is the same for both the deflecting directions and that a light spot 141 formed by the light beam 101 on the target 140 moves along a circular trajectory at a fixed radius R which is the maximum deflection radius.

The light spot 141 has a diameter $d_{spot}$ that may for example be defined as the diameter at which the intensity of the light beam focused on the target is reduced to $1/e^2$ or any fraction or multiple thereof, depending on the eventually desired beam overlap for the application. Any other commonly used definition for the beam diameter may be used instead.

As indicated above, a center point 142 of the light spot 141 moves along a circle 143 having a radius R that depends on the amplitude of the control signals. The angle φ of the light spot on the target in the xy-coordinate system over time evolves as $$\varphi(t)=2\pi f_{res}t,$$

the speed of the light spot is $$v(t)=2\pi R f_{res},$$

and the length l of a circular path travelled by the light spot is $$l(t)=2\pi R f_{res}t.$$

If the light is pulsed, i.e. repeatedly switched completely on and off, individual light spots 141 are formed on the target 140. Preferably, the pulse on-time is very short compared to $1/f_{res}$ so that the spots are not smeared out by the motion. If the pulse repetition frequency PRF is kept constant, a distance $d_L$ between the center points of adjacent spots is given by $$d_L=2\pi R f_{res}/PRF,$$

and the total number of spots around the circle is given by $$n=PRF/f_{res}.$$

For example, if PRF=100 $f_{res}$, 100 light spots are generated on the entire circle, and adjacent spots are spaced by an angle difference Δφ of 3.6° from each other.

FIG. 3 shows a time diagram illustrating examples for a relation between the pulse repetition frequency PRF of the light beam 101 and the resonance frequency $f_{res}$. As shown in the figure, the angle φ of the light spot 141 on the target 140 linearly increases over time with a time period that is the reciprocal value of the control signal frequency which preferably is chosen to be the resonance frequency $f_{res}$. After one period of the control signal is completed, the angle φ reaches the value 2π which corresponds to the same position of the light spot 141 as for an angle of θ. The curve therefore jumps from 2π to 0 and starts over again.

Here, the light pulses occur with a predetermined pulse repetition frequency PRF at specific time points. In order to achieve a predetermined angle difference Δφ between the light spots 141 of subsequent light pulses, and thus a number of n=2π/Δφ light spots along the circumference of the circle 143, the control signal frequency f res and the pulse repetition frequency PRF are selected to fulfill the condition $$f_{res}/PRF=i+\Delta\varphi/2\pi$$

wherein i is an integer ≥0 and corresponds to the amount of full extra turns (which may also be called dark turns, idle turns or waiting turns) around the circle between light pulses.

The figure shows an example in which 10 light spots 141 are generated with a phase difference of Δφ=2π/10=36° on the circumference of the circle 143 on the target 140. The figure shows the cases in which $f_{res}$/PRF is selected to be 0.1 (small unfilled circles in the figure, no idle turns between the light spots), 1.1 (small filled circles, one idle turn between the light spots), and 4.1 (small crossed circles, four idle turns between the light spots).

In order to achieve the effect that the light spots 141 are not only generated on the circumference of the circle 143, but anywhere in the entire area within the circle 143, evenly filling it, the present invention suggests to change the amplitude of the control signal over time.

Figure 5:
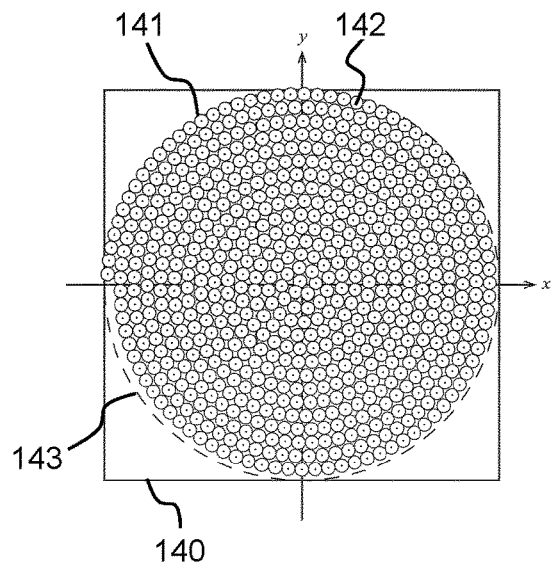
FIG. 5 shows a distribution of the light spots on the target.

FIG. 4 shows a trajectory followed by the center of the deflected light beam on the target, and FIG. 5 shows a distribution of the light spots on the target. As in FIG. 1, the maximum square image 140 is indicated in the figures by a solid line, and the maximum circular image area 143 by a dashed line.

As can best be seen from FIG. 4, the center point 142 of the light spot 141 does no longer move along a circular path as in the example described above with reference to FIG. 2, but along a spiral path 144. Such a spiral may be achieved by synchronously increasing or decreasing the amplitude of the two control signals for the first and second deflection elements 111, 112. Therein, the case is still considered in which both the control signals are the resonance frequency $f_{res}$ and have the same amplitude and a phase difference of 90°.

As an example, if the amplitude of both the control signals and thus the amount of both the deflections is linearly increased over time, an arithmetic spiral (also known as Archimedean spiral) is generated beginning at the center point 145 in which the radius r(t) of the spiral is proportional to the time and to the phase angle φ(t) of the light spot 141:

$$r(t) = \varphi(t) d_r / 2\pi = d_r f_{res} t,$$

wherein $d_r$ is the distance between adjacent spiral windings in the radial direction. The radial distance is preferably set to the value of the spot diameter $d_{spot}$.

As can best be seen from FIG. 5, the light spots 141 are densely packed along the spiral trajectory by generating a pulse every time the light spot 141 has advanced by a path length $d_L$ along the spiral. Preferably, a spot distance $d_L$ is selected as $d_L = d_r = d_{spot}$. Since the speed v(t) of the light spot increases with the radius r(t) and thus with the phase φ(t), the pulse repetition frequency PRF also has to be increased over time to achieve a constant distance $d_L$ between adjacent light spots. The light spots thus may be evenly distributed within the circular image area except for a small region around the origin, i.e. the first revolution of the spiral 144 around its center point 145, where the first few spots overlap slightly.

For projecting an image to the circular imaging area, the intensity of the individual light pulses may be suitably changed to achieve a desired pattern. Examples of patterns are described below with reference to FIGS. 14a and 14b. As an alternative to the use of pulses, a continuous light beam which is intensity modulated may be used for projecting the image.

The embodiment described above has the effect that an imaging area filled with pixels (picture elements where a light spot may be generated) can also be generated in a system using deflection elements which are resonantly enhanced and therefore do not support a scanning of the image area row by row. Instead of being aligned along straight rows, the pixels of this image area are aligned on a single row which is rolled up into a spiral.

If the operating parameters are suitably selected, a distance between a center point of adjacent pixels may be set to the diameter of the light spot (=the pixel size) in the radial direction as well as in the tangential direction so that the entire imaging area may completely be irradiated. An equal distance between adjacent pixels along the spiral path can thus be realized over a wide area of a target imaging area, and also a distance between the pixels on adjacent spiral windings is approximately the same.

The present invention thus is able to combine the advantage of a resonantly enhanced deflection system, i.e. that a voltage to be supplied to the deflection elements is significantly reduced, with the advantage of a deflection system which is not resonantly enhanced, i.e. that an imaging area can completely be scanned within one frame period. The size of the area that can be scanned with an approximately constant pixel distance is the interior of a circle having a diameter determined by the maximum deflection. This is π/4=78% of the size of a square having the same maximum deflection. Compared to the earlier described method using Lissajous figures, where about 36% of the maximum area can be scanned with an almost constant pixel distance, the usable area in the present invention is more than doubled for a given maximum deflection range or angle.

Figure 6:
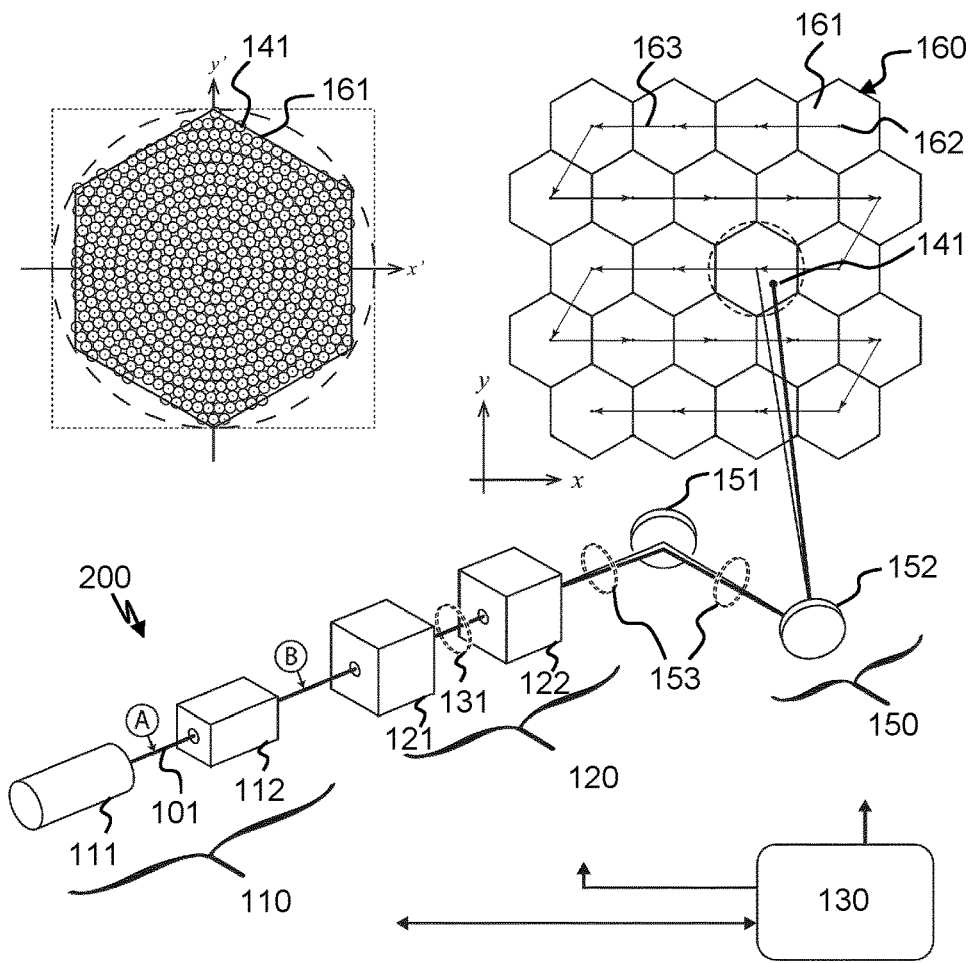
FIG. 6 shows a schematic perspective view of a two-dimensional projection device according to a second embodiment of the present invention.

FIG. 6 shows a schematic perspective view of a two-dimensional projection device according to a second embodiment of the present invention.

The projection device 200 mainly comprises the same elements as the projection device 100 and is operated in a similar way. In the following, only the differences from the projection device 100 are therefore described.

In addition to a first light beam deflection unit 120 which corresponds to the light beam deflection unit 120 of the first embodiment and therefore is designated by the same reference sign, the projection device 200 also comprises a second light beam deflection unit 150. While the first light beam deflection unit 120 comprises two one-dimensional resonantly enhanced deflection elements 121, 122, the second light beam deflection unit 150 comprises two one-dimensional deflection elements 151, 152 which may for example be DC controlled. The deflection elements 151, 152 may, for example, be realized as galvanometer mirrors. The deflection elements 151, 152 have a higher deflection range than the resonantly enhanced deflection elements 121, 122, but are slower and have a much higher inertia against changes of velocity and direction.

In a similar way as between the two deflection elements 121, 122, relay optics 153 (shown in the figure in dashed lines) may be arranged between the deflection elements 151, 152 and/or between the first and second deflection units 120, 150. Further focusing optics (not shown in the figure) may be arranged downstream of the second deflection unit 150.

By combining the first and second light beam deflection units 120, 150, an area that can be reached by the light beam 101 is significantly increased. The target plane 160 in the present embodiment is subdivided into individual target areas 161. Since the imaging area of the first light beam deflection unit 120 is a circle, the target areas 161 preferably have a hexagonal shape fitting into the circle. Further, they preferably are arranged adjacent to each other. However, the present invention is not restricted to this specific example.

In operation, the second light beam deflection unit 150 is controlled so that a light beam 101 not deflected by the first light beam deflection unit 120 hits the center point 162 of a target area. Then, an irradiation along the spiral is carried out as described in the first embodiment. Then, the second light beam deflection unit 150 jumps to the center point 162 of the next hexagon 161. Again, an irradiation along the spiral is carried out and so on. The pattern illuminated during each step may be restricted to the area of the spiral lying within the hexagon to avoid an overlap.

As an alternative, if only specific areas of the target have to be irradiated, such as for example when cutting holes into a metal sheet, the second light beam deflection unit 150 needs not to scan the entire surface of the target 160, but may directly jump between the specific areas, e.g. the hole center positions, in case the hole is small enough to fit into the circular image region scanned by the first light beam deflection unit 120.

Next, different examples for generating a spiral trajectory similar to the spiral 144 shown in FIG. 4 using resonantly-enhanced deflector elements are described.

Figure 7:
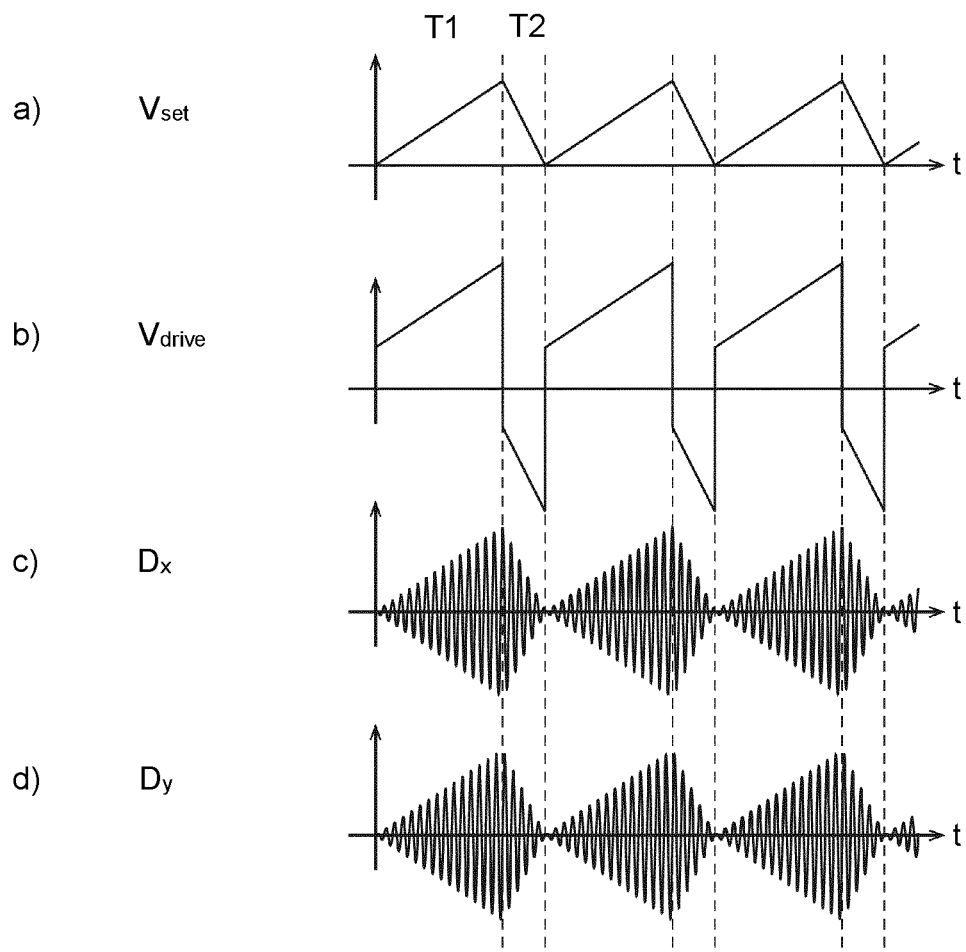
FIGS. 7a to 7d show a first example of schematic time diagrams of signals for achieving a desired trajectory on the target.

In order to achieve a desired change of an amplitude over time, a set signal $V_{set}(t)$ is prepared. FIG. 7*a* shows a first example of a waveform of a set signal $V_{set}(t)$. In a first time span T1, the set signal $V_{set}(t)$ has a linear ramp upwards from zero to a maximum value. In a second time span T2, the set signal $V_{set}(t)$ has a ramp downwards from the maximum value to zero. The waveform is repeated with a period of T=T1+T2.

In a resonant system, the amplitude of an alternating current voltage signal does not immediately follow the set signal, but has a response time τ. If the amplitude shall be forced to follow the set signal $V_{set}(t)$, a feedforward term has to be added. Therefore, for achieving an amplitude following the waveform of $V_{set}(t)$, on resonance, a drive signal of the form $$V_{drive}(t) = \left(1 + \tau \frac{\partial}{\partial t}\right) V_{set}(t)$$

has to be generated. The drive signal $V_{drive}(t)$ for achieving an amplitude following the set signal $V_{set}(t)$ of FIG. 7*a* is shown in FIG. 7*b*. An alternating current signal having a frequency f res and a fixed amplitude is multiplied with this drive signal $V_{drive}(t)$ in order to obtain the alternating current voltages $V_x(t)$ and $V_y(t)$ which are supplied to the deflection elements 121, 122. The resulting deflections $D_x(t)$ in the x-direction and $D_y(t)$ in the y-direction are shown in FIGS. 7*c* and 7*d*, respectively. It can be seen that due to the feedforward term included in the drive signal $V_{drive}(t)$, the deflection amplitude envelope follows $V_{set}(t)$ exactly.

Figure 8:
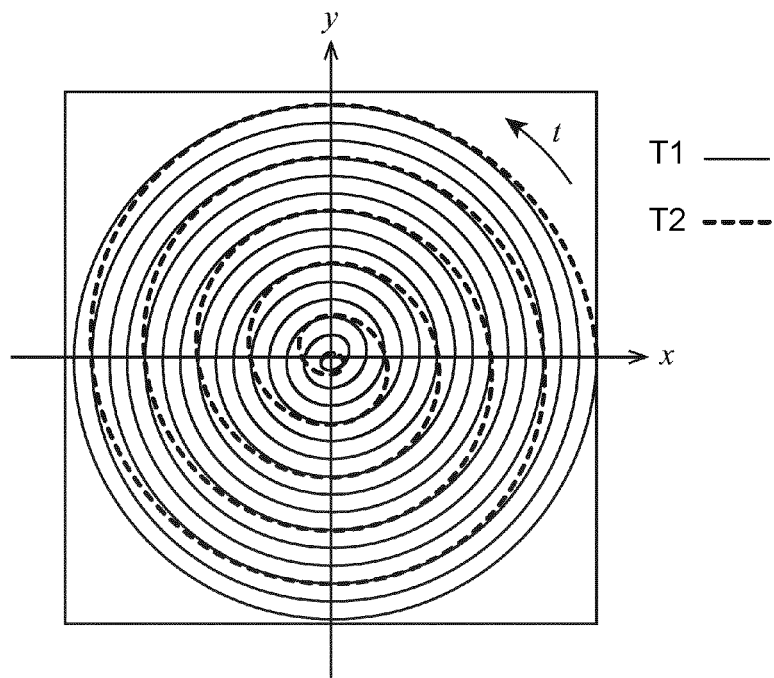
FIG. 8 shows the trajectory followed by the center of the deflected light beam on the target when the set signal shown in FIG. 7a is used.

FIG. 8 shows the trajectory followed by the center of the deflected light beam on the target when the set signal $V_{set}(t)$ of FIG. 7*a* is applied. During the time span T1, the spiral grows from its center point to the maximum radius as shown by a solid line. During the time span T2, the spiral shrinks from its maximum radius back to zero as shown by a dashed line.

Since T2 is shorter than T1, the downwards ramp is steeper than the upwards ramp. Therefore, the downwards spiral has less windings than the upwards spiral. In other words, the radial distance between adjacent windings is greater. Preferably, the time span T1 is used for the irradiation of the target as described in the above embodiments, and the time span T2 is not used for the irradiation of the target. During this time, for example, the second light beam deflection unit 150 shown in FIG. 6 may be actuated in order to move the imaging area to the next destination.

In the example shown in FIG. 8, the upwards ramp has 15 windings, and the downwards ramp has 5 windings. At a typical resonance frequency $f_{res}$ of 300 kHz, the time period T is approximately 67 μs, and the frame repetition frequency 1/T is 15 kHz.

The time scheme may also be inverted so that T1 is shorter than T2. In this case, the downwards spiral generated during the time span T2 may be used for the irradiation of the target.

If the period T in which the set signal $V_{set}(t)$ is repeated is an integer multiple of 1/f res, the spiral of the second period (and each further period) is congruent to the one of the previous period, thus achieving a reproducible pattern. Otherwise, the spiral of each period is rotated by a predetermined phase compared to the one of the previous period. This applies also to the following examples.

FIG. 9*a* shows a second example of a waveform of a set signal $V_{set}(t)$. FIG. 9*b* shows the waveform of a corresponding drive signal $V_{drive}(t)$. FIGS. 9*c* and 9*d* show the resulting deflections $D_x(t)$ in the x-direction and $D_y(t)$ in the y-direction, respectively.

In this second example, a first time span T1 for the upwards ramp and a third time span T3 for the downwards ramp are made equal. During an (optional) second time span T2 between the first and third time spans T1, T3, the amplitude is held constant at its maximum value. The waveform is repeated with a period of T=T1+T2+T3.

Figure 9:
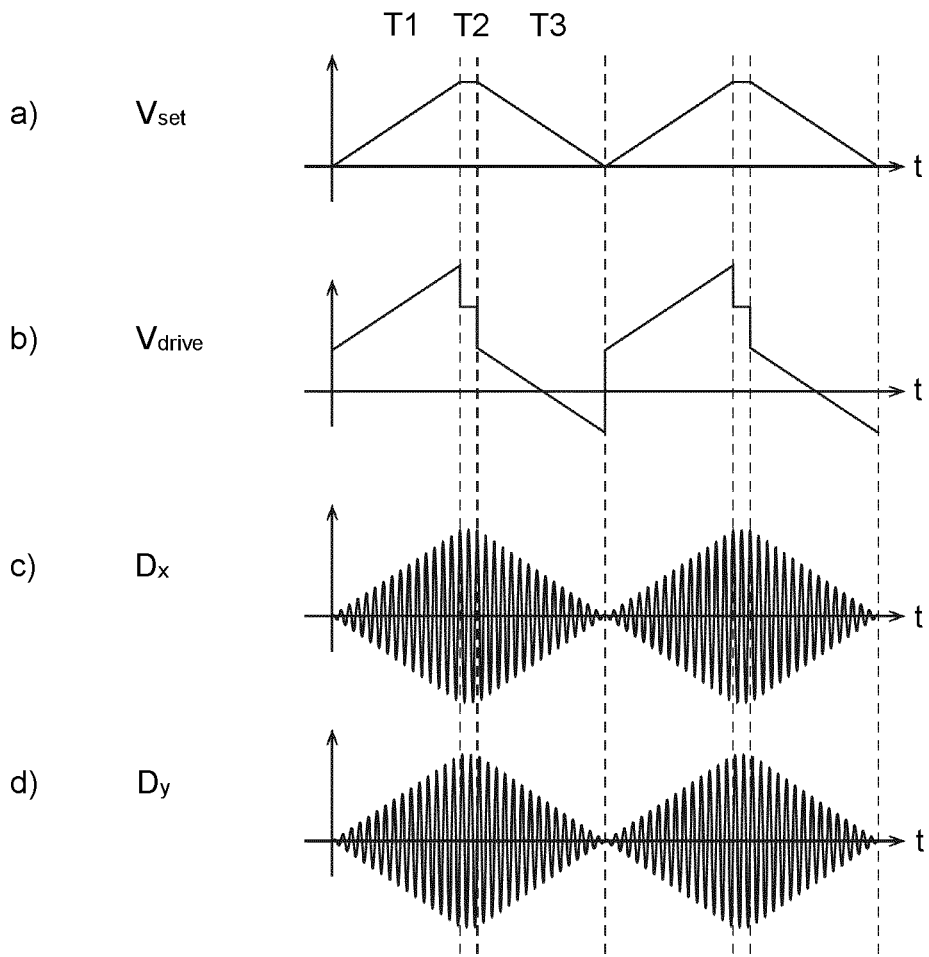
FIGS. 9a to 9d show a second example of schematic time diagrams of signals for achieving a desired trajectory on the target.
Figure 10:
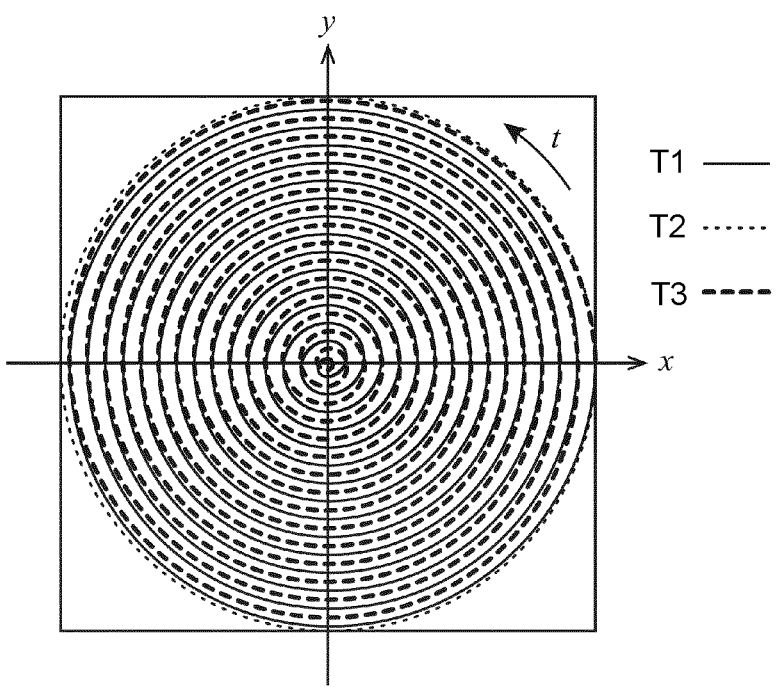
FIG. 10 shows the trajectory followed by the center of the deflected light beam on the target when the set signal shown in FIG. 9a is used.

FIG. 10 shows the trajectory followed by the center of the deflected light beam on the target when the set signal $V_{set}(t)$ of FIG. 9*a* is applied. During the time span T1, the spiral grows from its center point to the maximum radius as shown by a solid line in the same way as in the example shown in FIGS. 7 and 8. During the time span T2, the amplitude and thus the radius remains constant and the center points of the light spots move on a circle as shown by a dotted line. This might be for example be used to ensure that a drilled hole or in general a projected pattern is actually circular. During the time span T3, the spiral shrinks from its maximum radius to zero as shown by a dashed line.

Since T1 and T3 are equal, both the upwards spiral and the downwards spiral have the same number of windings and the same radial distance $d_r$. They therefore may be used both for the irradiation of the target. Due to the inverse timing, however, the two spirals are mirror symmetric to each other. In the figure, they are mirrored on the x-axis, i.e. they have an inverted y-axis. Thus, the spots of the downwards spiral on the y-axis lie halfway in between the spots of the upwards spiral whereby the resolution of the projection on the y-axis is doubled.

Figure 11:
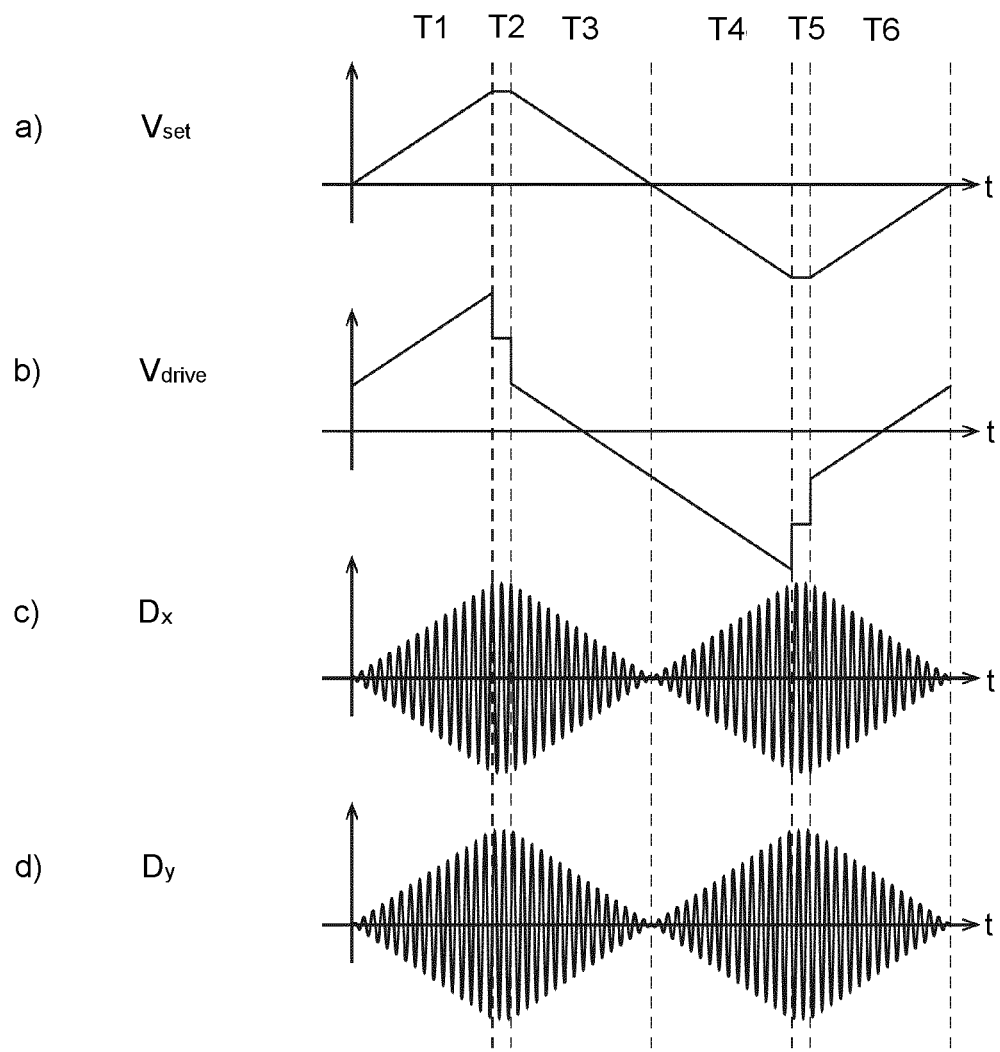
FIGS. 11a to 11d show a third example of schematic time diagrams of signals for achieving a desired trajectory on the target.

FIG. 11*a* shows a third example of a waveform of a set signal $V_{set}(t)$. FIG. 11*b* shows the waveform of a corresponding drive signal $V_{drive}(t)$. FIGS. 11*c* and 11*d* show the resulting deflections $D_x(t)$ in the x-direction and $D_y(t)$ in the y-direction, respectively.

The third example differs from the second example in that the waveform of the set signal $V_{set}(t)$ during time spans T1, T2, T3 is repeated during T4, T5, T6 with an inverted sign. The waveform is repeated with a period of T=T1+T2+T3+T4+T5+T6. In the present example, the time spans are selected to be T1=T3=T4=T6 and T2=T5.

Compared to the example shown in FIG. 9, an advantage of this drive scheme is that the number of steps in the drive signal $V_{drive}(t)$ is reduced. They can further be minimized if the holds at the maximum amplitude are omitted.

The inversion of the sign of the set signal $V_{set}(t)$ at the zero transitions causes a phase jump of 180° in the deflections $D_x(t)$, $D_y(t)$, resulting in a phase difference of 180° between the deflections $D_x(t)$, $D_y(t)$ during the time spans T4, T5, T6 compared to those during the time spans T1, T2, T3.

FIGS. 12*a* to 12*d* show the trajectories followed by the center of the deflected light beam on the target when the set signal $V_{set}(t)$ of FIG. 11*a* is applied. During the time span T1, the spiral grows from its center point to the maximum radius as shown by a solid line. During the time span T2, the amplitude and thus the radius remains constant and the center point of the deflected light spot moves on a circle (not shown in the figure). During the time span T3, the spiral shrinks from its maximum radius to zero as shown by a dashed line in FIGS. 12*b* and 12*d*. During the time span T4, the spiral grows again from its center point to the maximum radius, but with an inverted phase, as shown by a dot-dashed line in FIG. 12*a*. During the time span T5, the amplitude and thus the radius again remains constant. During the time span T6, the spiral shrinks from its maximum radius to zero, as shown by a dotted line in FIGS. 12*c* and 12*d*.

Figure 12:
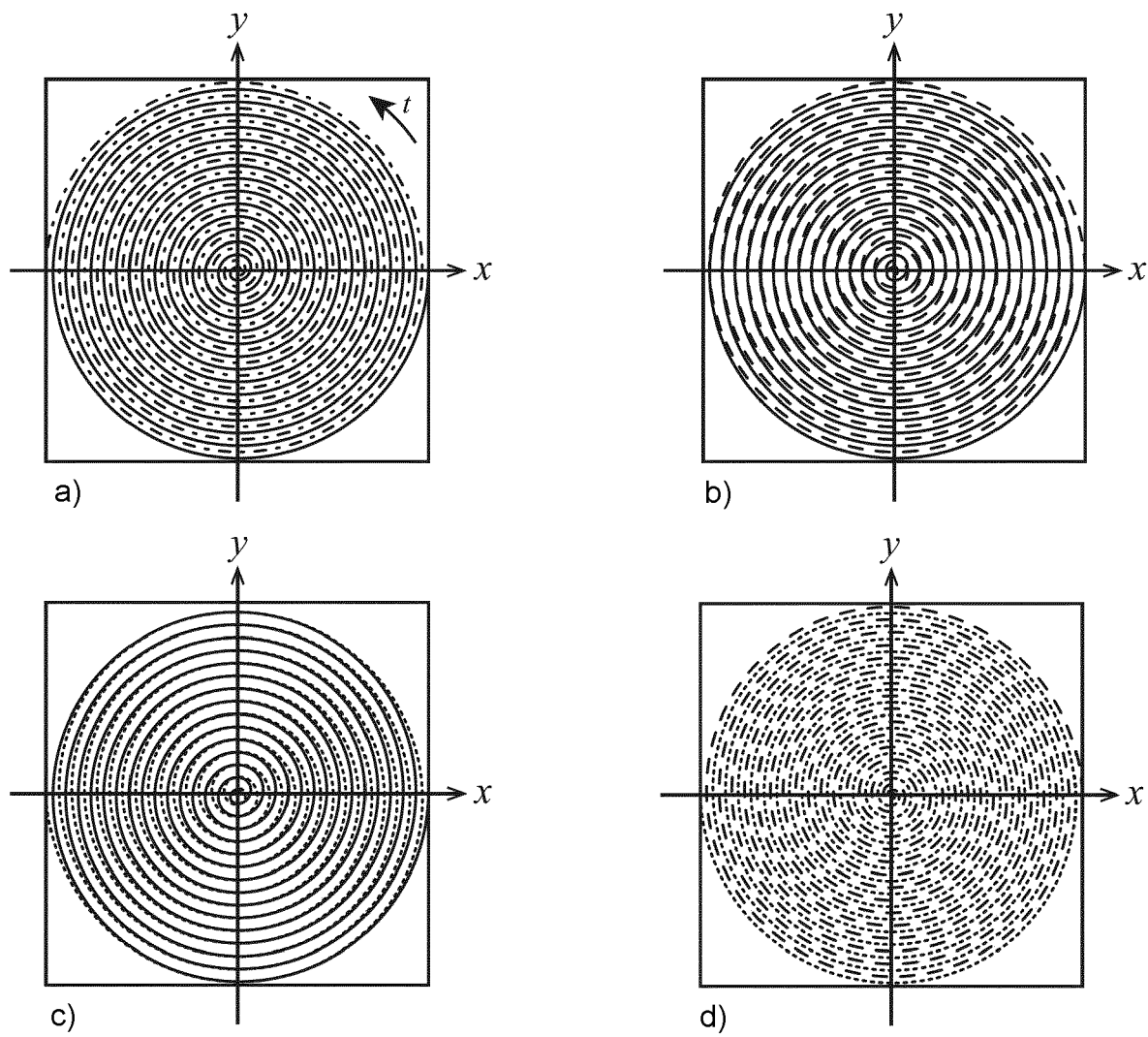
FIGS. 12a to 12d show trajectories followed by the center of the deflected light beam on the target when the set signal shown in FIG. 11a is used.

All the four spirals may be used for the irradiation of the target. As indicated above with reference to FIG. 10 (and FIG. 12*b*), the spiral during the time span T3 has the y-axis inverted compared to the spiral during the time span T1. In a similar way, the spiral during the time span T4 has both the x-axis and the y-axis inverted, and the spiral during the time span T6 only the x-axis (FIG. 12*c*). This results in the two upwards spirals during the time spans T1 and T4 being point symmetrical to each other around the origin as shown in FIG. 12*a* as are the two downwards spirals during the time spans T3 and T6 as shown in FIG. 12*d*. When both the spirals are used, a doubled spatial resolution in a radial direction may be achieved over the entire imaging area. Similar as shown above in FIG. 10, adjacent upwards and downwards spirals are mirror symmetrical to each other, which is shown in FIG. 12*b* for the spirals during the time spans T1, T3 and in FIG. 12*c* for the spirals during the time spans T1, T6.

In a further example, a set signal $V_{set}(t)$ as shown in FIG. 9*a* may be used for one of the deflecting elements, while a set signal $V_{set}(t)$ as shown in FIG. 11*a* may be used for the other deflecting element.

While examples for achieving a spiral as a trajectory followed by the center of the deflected light beam on the target are described above, the present invention is not restricted thereto. For example, a stepwise increasing set signal may be provided instead of a ramp so that concentric circles are generated as a trajectory on the target.

Next, different examples for generating light pulses suitable for the present invention are described with reference to FIG. 13. Therein, A designates a timing diagram of the light beam 101 at the position (A) shown in FIG. 1, 112 designates a time dependent transfer function of the intensity modulation element 112, and B designates a timing diagram of the light beam 101 at the position (B) shown in FIG. 1.

FIG. 13*a* shows schematic time diagrams for a light beam generation unit that supports true pulse-on-demand operation. The light source 111 emits a light beam 101 comprising light pulses having identical duration and energy. The timing of the light pulses (the time points at which the light pulses occur) may arbitrarily be triggered by the control unit 130 as required. Such a triggering may be achieved for example by using the method described by Andreas Oehler et al. which is indicated above. The (optional) intensity modulator 112 may be used to individually vary the light intensity of the pulses, for example by multiplying them with a time dependent transfer function, to obtain a light beam 101 comprising light pulses having light intensities differing from each other. This may for example be used for an anti-aliasing/gray scale image projection, or to compensate for deflection-dependent attenuation through the deflection system to ensure a constant fluence across the whole field, e.g. for ps-laser machining applications which exhibit a fluence-dependent ablation spot diameter.

FIG. 13*b* shows schematic time diagrams for a light beam generation unit having a fixed pulse rate source with gating or pulse-picking which is a very common type of source for ps and fs pulses. The light source 111 emits a light beam 101 comprising light pulses having identical duration and energy at a pulse rate which is essentially fixed. By the intensity modulator 112, the pulses closest to the ideal timings are transmitted, the remaining pulses are suppressed. This method is called gating or pulse-picking and also sometimes referred to as "pulse-on-demand", even if the pulse does not directly follow the trigger signal but may be delayed by one pulse period at the maximum. As above, the intensity modulator 112 may also be used to individually vary the light intensity of the pulses.

FIG. 13*c* shows schematic time diagrams for a light beam generation unit having a continuous wave light source. The light source 111 emits a continuous light beam 101 having a constant amplitude. The pulse forming (or pulse carving) is then carried out by the intensity modulator 112 which transmits or suppresses the light beam according to a given scheme. As above, the intensity modulator 112 may also be used to individually vary the light intensity of the generated pulses. For this case, the intensity modulator has to be fast enough to cut out pulses short enough to not be smeared out due to the high path velocity on the outer windings of the spiral. It should also allow for a high enough pulse repetition rate.

FIGS. 14*a* and 14*b* show examples for patterns that may be generated by the projection device 100.

FIG. 14*a* shows the representation of an uppercase letter Q. The conversion of the desired pattern into a spiral bitmap can be done using the known methods for image processing. Thereby, grayscale values for each pixel are achieved. The control unit 130 controls the light beam deflection unit 120 to generate a spiral pattern as shown in FIG. 5. It also controls the intensity modulation element 112 to change the intensity of the light beam 101 so that the desired pattern is achieved by the light spots 141. In the figure, a black filling represents maximum intensity, a white filling represents zero intensity. Alternatively, when working with fixed intensity light pulses, gray-scale pixel values may be realized by repeating the pattern several times and turning on a spot only in a fraction of the number of repetitions depending on its gray scale value.

FIG. 14*b* shows the representation of a logo. The extent of the logo is smaller than the circle 143 indicating the maximum deflection. Further, there is an empty region inside the logo. Therefore, it is not required to generate a ramp over the entire amplitude range from zero to the maximum, but only between the values corresponding to the light points 141*a* and 141*b*. Thereby, the frame repetition rate can be increased. For the specific example shown, only half the number of revolutions are necessary, resulting in a speed up by a factor of two. This might be useful for example for micro-texturing applications, where the same pattern has to be repeated many times.

The spiral trajectory achieved by the present invention may also be advantageous for the micro-machining of circular structures, such as disks, rings, cones or holes, as long as the structure fits into the circular field. For disks and holes, a full spiral pattern may be used and all the light spots may be turned on. For rings, a radially truncated spiral pattern as in FIG. 14*b* may be used and all the light spots may be turned on, or a full pattern as in FIG. 14*a* may be used and the central light spots may be left off. Conical structures may be made of rings where the diameters vary with the layer depth. As mentioned earlier, one or more revolutions at the minimum and/or maximum deflection radii may be included to ensure proper circularity.

Applications for the projection device and method according to the invention include, for example, image projection, irradiation of light-sensitive materials (for example printing, lithography, photosensitive etching, 3D printing, etc.), scanning of objects (e.g. LIDAR, microscopy, etc.), or material processing by means of laser ablation.

The invention claimed is:

1. A projection device for directing a light beam to a target, the projection device comprising:
a first light beam deflection unit for two-dimensionally deflecting a light beam in a first direction with a first deflection frequency and in a second direction with a second deflection frequency substantially equal to the first deflection frequency; and
a control unit for controlling the first light beam deflection unit, wherein the control unit is configured to control the first light beam deflection unit in such a way that a light spot generated by the light beam on the target moves along a nearly circular path changing its radius over time;
wherein the first light beam deflection unit comprises a first deflection element controlled by a first alternating current voltage for deflecting the incoming light beam in the first direction and generating a one-dimensionally deflected light beam, and a second deflection element controlled by a second alternating current voltage for deflecting the one-dimensionally deflected light beam in the second direction and generating the two-dimensionally deflected light beam;
wherein at least one of the first or second deflection elements is resonantly enhanced for internally generating a signal having an amplitude increased over the amplitude of the alternating current voltages; and
wherein an amplitude of the alternating current voltages is synchronously increased or decreased so that the light spot moves along a spiral in such a way that a radial distance between subsequent windings of the path is constant.

2. The projection device according to claim 1, wherein the control unit is configured to control the first light beam deflection unit in such a way that an amplitude of the alternating current voltages is repeatedly increased from zero to a maximum amplitude within a first time span and thereafter decreased again to zero within a second time span shorter than the first time span, or the control unit is configured to control the first light beam deflection unit in such a way that an amplitude of the alternating current voltages is repeatedly decreased from a maximum amplitude to zero within a first time span and thereafter increased again to the maximum amplitude within a second time span shorter than the first time span.

3. The projection device according to claim 1, wherein the control unit is configured to control the first light beam deflection unit in such a way that an amplitude of the alternating current voltages is repeatedly increased from zero to a maximum amplitude within a first time span and thereafter decreased again to zero within a second time span equal to the first time span.

4. The projection device according to claim 1, wherein the control unit further is configured to control a light beam generation unit to generate the incoming light beam as a sequence of light pulses, and wherein a pulse repetition frequency of the incoming light beam is modified depending on an instantaneous radius of the path.

5. The projection device according to claim 1, wherein the control unit further is configured to control the light beam generation unit to turn on or off and/or to change the intensity of the light beam so that the light spots along the spiral path form a desired arbitrary irradiation pattern.

6. The projection device according to claim 1, further comprising a light beam generation unit for generating the incoming light beam.

7. The projection device according to claim 6, wherein the light source is configured to emit a light beam comprising light pulses having a constant amplitude and variable time distance and an intensity modulation element is configured to selectively modify an amplitude of each of the light pulses, and/or
the light source is configured to emit a light beam comprising light pulses having a constant amplitude and constant pulse repetition frequency and the intensity modulation element is configured to blank out individual light pulses and to selectively modify an amplitude of each of the remaining light pulses, and/or
the light source is configured to emit a continuous wave light beam having a constant amplitude and the intensity modulation element is configured to form individual light pulses from the continuous wave light beam and to selectively modify an amplitude of each of the formed light pulses.

8. The projection device according to claim 1, further comprising a second light beam deflection unit for two-dimensionally deflecting the deflected beam emitted by the first light beam deflection unit and directing the twice two-dimensionally deflected light beam to the target.

9. The projection device according to claim 8, wherein the first light beam deflection unit is a resonantly enhanced deflection unit exhibiting a small maximum deflection, and the second light beam deflection unit is a not resonantly enhanced deflection unit comprising movable parts and exhibiting a large maximum deflection.

10. A method for controlling a projection device for directing a light beam to a target, the projection device comprising a light beam deflection unit for two-dimensionally deflecting a light beam in a first direction with a first deflection frequency and in a second direction with a second deflection frequency substantially equal to the first deflection frequency, the light beam deflection unit comprising a first deflection element for deflecting the light beam in the first direction and a second deflection element for deflecting the light beam in the second direction, the first and second deflection elements being controlled by first and second alternating current voltages to deflect the light beam in the first and second directions, the first and second deflection elements being resonantly enhanced for internally generating signals having an amplitude increased over the amplitude of the alternating current voltages, wherein the method comprises:
controlling the light beam deflection unit in such a way that a light spot generated by the light beam on the target moves along a nearly circular path changing its radius over time, and
synchronously increasing or decreasing an amplitude of the alternating current voltages so that the light spot moves along a spiral in such a way that a radial distance between subsequent windings of the path is constant.

11. The projection device according to claim 3, wherein the control unit is configured to maintain the amplitude of the alternating current voltages at the maximum amplitude for a third time span shorter than the first and second time spans and/or the control unit is configured to achieve a phase jump of 180° in a waveform of at least one of the alternating current voltages at the time the amplitude reaches the value of zero.

12. The projection device according to claim 4, wherein the control unit is configured to control the light beam generation unit so that the pulse repetition frequency of the incoming light beam is set or varied in such a way that a distance between the center points of adjacent light spots is constant.

13. The projection device according to claim 1, wherein at least one of the first or second deflection elements comprises an electro-optic deflector or micro-opto-electro-mechanical mirror.

14. The projection device according to claim 6, wherein the light beam generation unit comprises a light source for generating an unmodulated light beam, and/or the light beam generation unit further comprises an intensity modulation element for modulating an intensity of the unmodulated light beam.

15. The projection device according to claim 9, wherein the control unit further is configured to control the second light beam deflection unit in such a way that a center of the spiral generated by the first light beam deflection unit is slowly or stepwise moved along a path on the target.

* * * * *